UNITED STATES PATENT OFFICE.

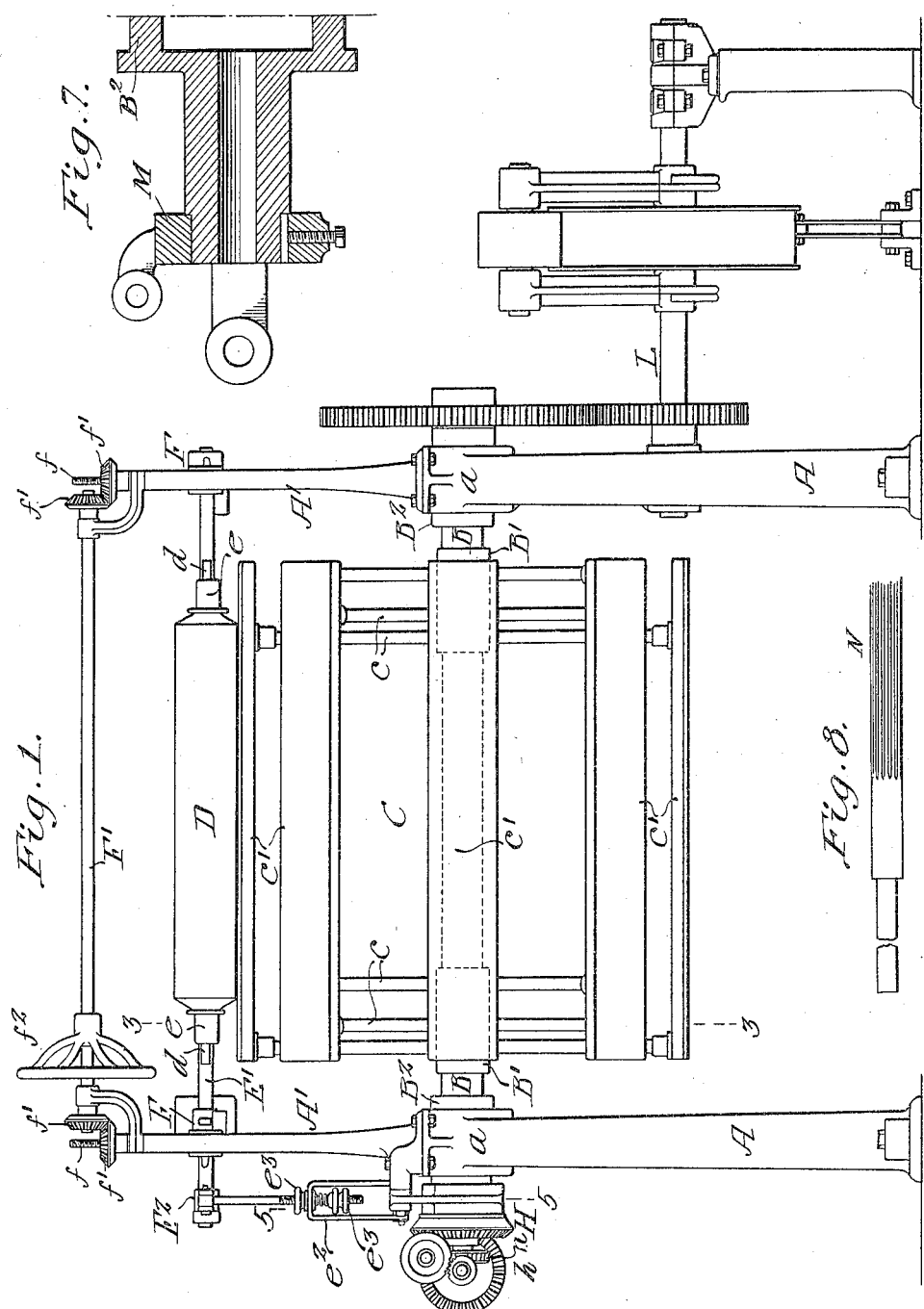

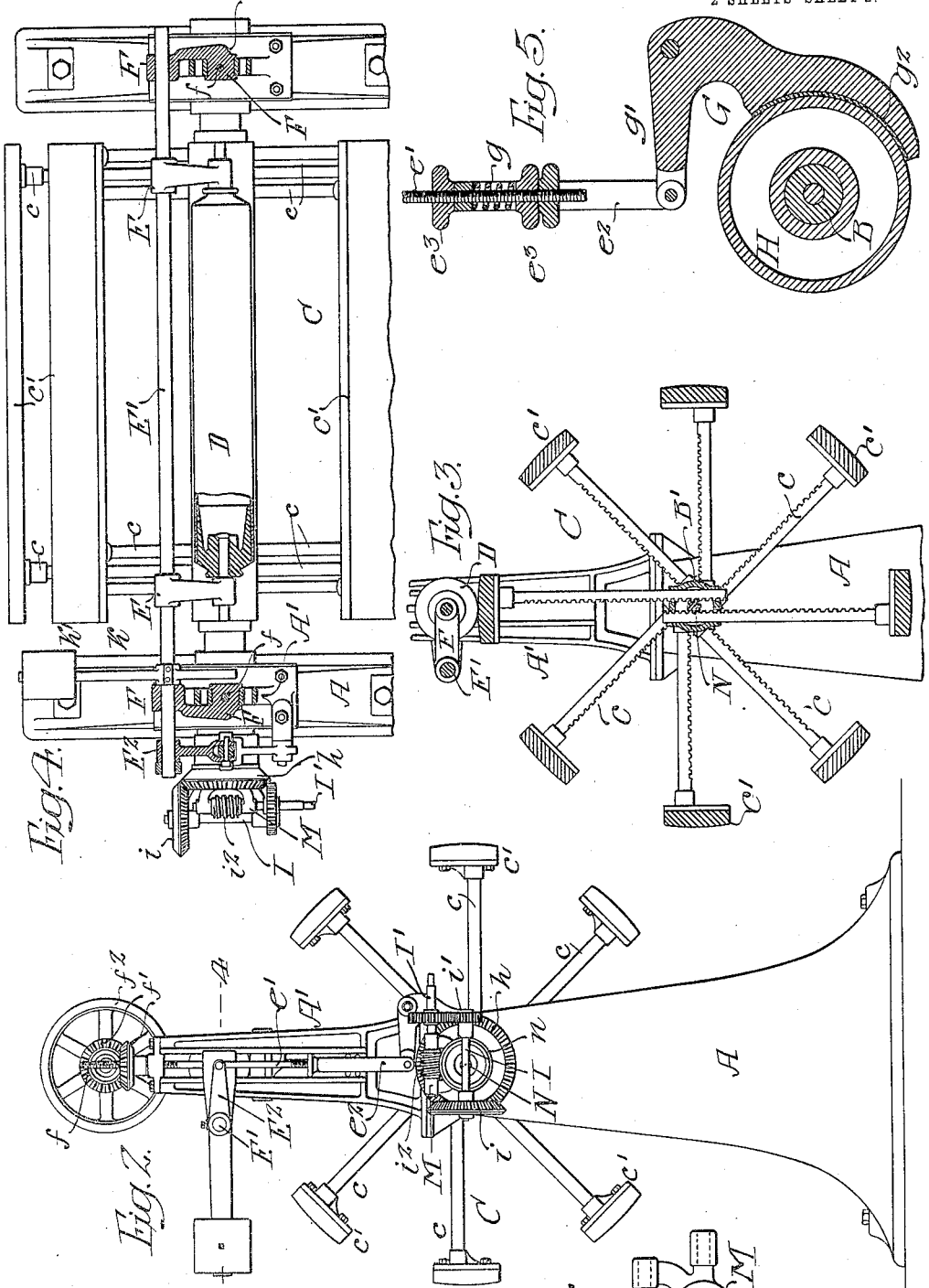

GUYON MILLER, OF DOWNINGTOWN, PENNSYLVANIA, ASSIGNOR TO DOWNINGTOWN MANUFACTURING COMPANY, OF DOWNINGTOWN, PENNSYLVANIA, A CORPORATION OF PENNSYLVANIA.

REEL FOR WINDING PAPER.

1,075,051. Specification of Letters Patent. Patented Oct. 7, 1913.

Application filed April 19, 1912. Serial No. 691,904.

*To all whom it may concern:*

Be it known that I, GUYON MILLER, a citizen of the United States, residing in Downingtown, county of Chester, State of Pennsylvania, have invented certain Improvements in Reels for Winding Paper, of which the following is a specification.

My invention relates to certain improvements in reels for winding paper as set forth and claimed in an application filed by me on or about the sixth day of March 1911, under Serial No. 612,476.

The invention is particularly applicable for reeling tissue paper, but it will be understood that any paper may be reeled without departing from the essential features of the invention.

In the application referred to above, automatic means are provided for controlling the reel as it rotates so that the paper will be laid on the reel at the same distance from the center of the reel so that when the paper is cut from the reel, the sheets will all be of the same length.

The present invention relates to certain improvements in details of construction whereby the mechanism is simplified and the automatic mechanism is made more accurate and more sensitive than the mechanism described in the above mentioned application for patent.

In the accompanying drawings:—Figure 1, is a side view of my improved machine for reeling paper; Fig. 2, is an end view; Fig. 3, is a transverse sectional view on the line 3—3, Fig. 1; Fig. 4, is a sectional plan view on the line 4—4, Fig. 2; Fig. 5, is an enlarged sectional view on the line 5—5, Fig. 1; Fig. 6, is a detached view of one of the bearings; Fig. 7, is a detached side view of the bearing frame; and Fig. 8, is a detached perspective view of part of the pinion.

Referring to the drawings, A—A are the side frames having bearings $a$ at their upper ends for the shaft B on which the reel C is mounted.

A' are standards mounted on the frame A and these standards carry the bearings for the presser roll D. The shaft B has hubs $B^2$ at each end adapted to the bearings $a$ in the frame A. The shaft is hollow, as shown, and secured to the shaft are hubs B'. These hubs have a series of transverse passages therein; each passage being located at one side of the center of the hub, as illustrated in Fig. 3.

$c$—$c$ are a series of spokes arranged to slide in a passage in the hub and each pair of spokes carries a segmental rim $c'$. These rim sections are spaced a given distance apart to allow the paper to bag inwardly as it is being rolled upon the drum. Extending through the shaft B is a long pinion N. The teeth $n$ of this pinion mesh with the teeth on the spokes $c$ so that on turning the pinion in one direction the several spoke sections, with their rim sections, will be retracted and when turned in the opposite direction the spoke sections will be projected. The shaft B is driven by a main shaft L, through gearing, as shown.

D is a presser roll, which bears upon the paper as it is being wound upon the reel. On each end of the presser roll is a trunnion $d$. The trunnions are adapted to bearings $e$ on the arms E secured to a shaft E' adapted to vertically adjustable bearings F in the standards A'.

$f$—$f$ are screws connected to the bearings and these screws are turned in order to adjust the bearings F in unison, by means of a transverse shaft F' and bevel wheels $f'$. On the transverse shaft is a hand wheel by which it is turned.

In order to counterbalance the roller D, I secure an arm $k$ to the rock shaft E. Upon this arm is an adjustable weight $k'$. By adjusting this weight on the arm, the roller D can be properly counterbalanced so that it will bear with the desired pressure upon the paper. On one end of the shaft E' is an arm $E^2$, which is attached to a screw rod $e'$ which passes through a yoke $e^2$. Nuts $e^3$ on the rod adjustably confine the rod to the yoke and in order to allow the parts to yield in one direction, I provide a spring, which is located between the lower nut and the yoke so that upon the upward movement of the arm, the connection between the two parts may yield, if necessary. The yoke $e^2$ is connected to an arm $g'$ on a brake lever G. The concaved surface $g^2$ of the other arm of the brake lever G conforms in shape to the drum H, loosely mounted on the shaft B. On the end of this drum are beveled teeth $h$ with which mesh the teeth of the beveled wheel $i$ on a shaft I, which is geared to the shaft I' through gearing $i'$. On the shaft I' is a worm $i^2$, which meshes with a worm wheel $n$ on the long pinion N, which is geared to the spokes $c$ of the reel C. The shafts I and I' are mounted in bearings on a frame M keyed to the hub $B^2$ secured to the main shaft B and as the drum H is loosely mounted on the shaft B, it also freely rotates with the shaft when the brake lever G is not in contact with it. Consequently, the long pinion N is not driven independently of the shaft, but, as soon as the paper accumulates on the reel, it causes the roller D to be raised, the shaft E' being rocked and as the brake lever is connected to this shaft, it will move toward the drum; applying sufficient friction to the drum to prevent its rotation with the other gearing; its teeth acting as an annular rack; causing the beveled gear wheel $i$ to rotate and thus impart a rotary motion to the shafts I and I' and worm $i^2$. The worm $i^2$ will impart motion to the wheel $n$ and to the long pinion N. This long pinion, which is turned independently of the shaft B, will retract the spokes of the reel and will reduce the diameter of the reel until the roller D assumes its normal position when the brake lever will release the drum.

The mechanism is so sensitive that the paper will actuate it the moment the diameter of the reel exceeds the normal diameter desired so that as the paper accumulates on the reel, the reel will be retracted and the paper first reeled will bag between the segments. After the paper has been wound upon the reel to the thickness desired, it is cut and when the paper is laid out, the sheets will all be exactly the same length.

I claim:

1. The combination in a machine for winding paper, of a reel made of a series of retractable segments; a device bearing upon the paper wrapped around the reel; a shaft carrying the device; an arm on the shaft; a brake lever connected to the arm; a drum loosely mounted on the reel shaft and provided with a gear; and means for retracting the segments geared to the drum so that, when the brake is applied to said drum, the gear mechanism connected with the drum will be thrown into action and will retract the segments of the reel.

2. The combination in a machine for winding paper, of a reel made of a series of retractable segments having toothed spokes; a roller arranged to bear upon the paper wrapped upon the reel; a rock shaft mounted on the frame of the machine and having arms supporting said roller; an arm secured to one end of the shaft; a brake lever connected to the arm; a driving shaft upon which the reel is mounted; a drum loosely mounted on the driving shaft and adapted to be held by the brake lever; a beveled gear wheel on the drum; a bearing on the driving shaft; two shafts geared together and mounted on the bearing; one shaft having a gear wheel meshing with the beveled teeth on the drum and the other shaft having a worm; a worm wheel; a long pinion on which the worm wheel is mounted and meshing with the teeth on the spokes of the reel so that when motion is imparted to the pinion, the reel will be retracted.

3. The combination in a machine for winding paper, of a frame; a driving shaft mounted on the frame; a reel mounted on the driving shaft and having adjustable segments, said segments having toothed spokes; a long pinion meshing with the teeth of the spokes and located within the driving shaft; a rock shaft having arms; a presser roll carried by the arms and resting upon the paper on the reel and having an arm at one end; a brake lever pivoted to the frame and adjustably connected to said last mentioned arm; a drum loose on the main shaft and against which the brake lever is arranged to bear; a bearing secured to the shaft; two shafts geared together and mounted in the bearing; an annular row of teeth on the drum; a beveled wheel on one of the shafts meshing with the teeth of the drum; a worm on the other shaft; a worm wheel with which the said worm meshes; said worm wheel being mounted on said elongated pinion extending through the center of the power shaft upon which the reel is mounted and meshing with the teeth of the spokes of the reel.

4. The combination in a machine for winding paper, of a frame; a hollow shaft mounted thereon; a reel mounted on the shaft and consisting of a series of segments and toothed spokes; an elongated pinion extending through the shaft and meshing with the teeth on the spokes and having at one end a worm wheel; a bearing frame secured to the shaft; two short shafts geared together and mounted in the bearing frame; a worm on one shaft meshing with the worm wheel on the pinion; a beveled gear wheel; a drum loosely mounted on the hollow shaft and having an annular set of beveled teeth with which the beveled gear wheel meshes; a rock shaft; arms on the rock shaft; a drum mounted to turn freely in said arms and resting upon the paper as it is raised; an arm at one end of the rock shaft; a screw rod extending from the arm; a brake lever bearing upon the first named drum and pivoted to the frame; a yoke connected to one arm of the brake lever; nuts on the screw rod; and a spring located between the yoke and the lower nut so that there is a yielding connection between the rock shaft and the brake lever.

5. The combination in a paper reeling machine, of a power shaft; a retractable reel thereon; a rock shaft; arms on the rock shaft; a roller carried by the arms and arranged to bear upon the paper as it is reeled; said shaft having a counterbalance arm; an adjustable weight thereon for balancing the roller; means for retracting the reel; and mechanism connecting the retracting mechanism with the rock shaft so that as the paper lifts the roller and rocks the shaft, the reel will be retracted.

In testimony whereof, I have signed my name to this specification, in the presence of two subscribing witnesses.

GUYON MILLER.

Witnesses:
  Jos. H. Klein,
  Wm. A. Barr.